United States Patent [19]
Bell et al.

[11] 3,854,340
[45] Dec. 17, 1974

[54] ROTATING DYNAMIC ACCELEROMETER

[75] Inventors: Curtis C. Bell, Inglewood; Robert L. Forward, Oxnard, both of Calif.

[73] Assignee: Hughes Aircraft Company, Culver City, Calif.

[22] Filed: June 26, 1972

[21] Appl. No.: 266,167

[52] U.S. Cl. ........................................... 73/517 R
[51] Int. Cl. ........................................... G01p 15/08
[58] Field of Search ....... 73/516 R, 516 LM, 517 R, 73/514, 515

[56] References Cited
UNITED STATES PATENTS

| | | | |
|---|---|---|---|
| 2,638,556 | 5/1953 | Hausz | 73/516 LM X |
| 3,014,374 | 12/1961 | Johnston | 73/517 R |
| 3,178,946 | 4/1965 | Talbot | 73/517 R |
| 3,242,735 | 3/1966 | Fitzgerald | 73/517 R X |
| 3,253,471 | 5/1966 | Maillard | 73/517 R |

*Primary Examiner*—James J. Gill
*Attorney, Agent, or Firm*—Allen A. Dicke, Jr.; W. H. MacAllister, Jr.

[57] ABSTRACT

A mass-spring system is rotated so that the sensitive direction of the accelerometer is periodically pointed in the direction of an acceleration to be measured. The rotation causes the acceleration to act on the mass in different relative directions to modulate the measurement of the acceleration at the rotational speed, and dynamic transducers sense the motion. With low noise bearings, sensitive transducers, and low noise level electronics, low levels of acceleration can be sensed. The same structural design can be equipped for sensing higher acceleration levels.

10 Claims, 4 Drawing Figures

3,854,340

ROTATING DYNAMIC ACCELEROMETER

BACKGROUND

This invention is directed to an accelerometer, and particularly an accelerometer which has a rotating sensor which provides a dynamic signal.

The prior art includes a number of different styles of accelerometers. There are servo-accelerometers and pendulous accelerometers, both of which measure uniform acceleration. A torque measuring structure is described in U.S. Pat. No. 2,638,247 where a mass is mounted for rotation on a shaft. The driving torque is measured and presents an unmodulated signal. The employment of piezoelectric transducers for generation of various signals is shown in U.S. Pat. Nos. 2,638,556, 2,650,991, 2,726,074 and 3,101,003. In these patents, the transducers provide a modulated signal resulting from various inputs. However, the prior art does not provide a structure which is capable of design for low level acceleration signals which are best processed as a modulated signal, even when resulting from constant acceleration. The common gyro accelerometer employs gyro procession as an acceleration signal. Sensitivity is limited by cage bearing hysteresis. Thus, the prior art is incapable of devices for sensitively measuring low accelerations. Similarly, the art does not have a device which can be just as well designed for measuring larger accelerational values.

SUMMARY

In order to aid in the understanding of this invention, it can be stated in essentially summary form that it is directed to a rotating dynamic accelerometer which has a rotating structure including a mass-spring system with a transducer connected to measure strain of the spring. When the structure is rotated so that its sensitive direction is periodically pointed in the direction of an acceleration, the transducer produces a modulated signal which represents the acceleration.

Accordingly, it is an object of this invention to provide a rotating dynamic accelerometer which produces a modulated signal, even from constant acceleration. It is a further object to provide an accelerometer having a mass-spring system on a rotating structure so that the sensitive direction thereof is periodically pointed in the direction of the acceleration to be measured. It is a further object to provide a dynamic accelerometer which is capable of being designed as a device for measuring low-level, intermediate-level or high-level accelerations. It is still another object to provide an accelerometer which has a rotating structure which includes a mass-spring system therein which has a sensitive, deflection direction which is periodically pointed in the direction of the spring so that measurement of the spring strain is an indication of the amplitude of the acceleration, and rotation causes modulation of the measured signal.

Other objects and advantages of this invention will become apparent from a study of the following portion of the specification, the claims, and the attached drawings.

DESCRIPTION OF THE PREFERRED EMBODIMENT

Figure 1:
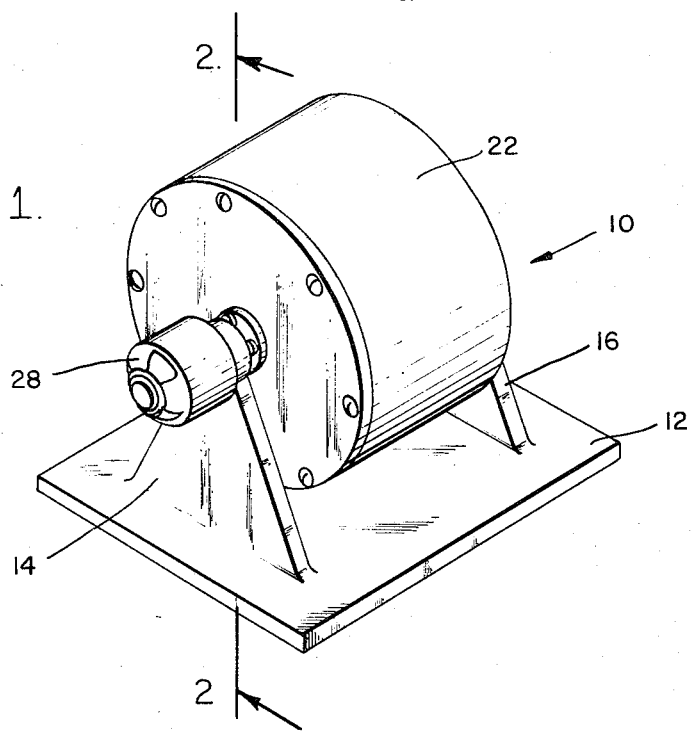
FIG. 1 is an external isometric view of the rotating dynamic accelerometer of this invention.

FIG. 1 is an external view of the rotating dynamic accelerometer 10. The accelerometer 10 is mounted upon a base 12 which serves as a mounting means, serves as a reference, and is connected to the structure the acceleration of which is to be measured. Base 12 is thus subjected to the same accelerations and serves both as a mounting means and as an accelerational input to accelerometer 10. Bearing supports 14 and 16 are mounted upon the base and extend upward to carry bearings 18 and 20. The bearings are mounted upon a common axis, which is the axis of rotation of the accelerometer housing 22. The housing carries stub shafts 24 and 26 which are secured to the housing 22 to rotate with the housing 22 and to constrain the housing 22 to rotation upon the bearing axis.

Bearings 18 and 20 are of such design and construction so that accelerations with a period longer than the sensor time constant, in the direction radial to the axis, are held to levels below the value of accelerations to be sensed by the accelerometer 10. When the accelerometer 10 is designed and constructed to sense very low-level accelerations, the bearings 18 and 20 must be of special design. The special design includes fluid film bearings, including gaseous fluids, as well as other means for supplying support forces, such as magnetic bearings. Modern, specially-designed magnetic bearings have a very low value of radial acceleration.

Motor 28 is mounted by bracket 30 on bearing support 14 or other relatively stationary base portion of the accelerometer. Motor 28 is connected to shaft 24 to rotate accelerometer housing 22 on its axis at the desired rotational speed. Since the rate of angular rotation of the housing 22 must be known and carefully controlled, a speed control servo feedback loop is preferably employed, as described below, to control motor 28 to maintain the correct, desired rotative speed.

Transducer housing 32 is mounted within accelerometer housing 22. Internal and external annular flanges 34 and 36 are respectively mounted interiorly of housing 22 and exteriorly of housing 32. They are connected by disc 38 which has an opening therein to receive transducer housing 32. The disc is secured to both of the angular flanges so that transducer housing is mounted centrally within and rotates with accelerometer housing 22.

Torque bar 40 is connected between the left side of accelerometer housing 22 and the left side of transducer housing 32 along the axis of the accelerometer. The torque bar is secured irrotatably at each of these points. Similarly, torque bar 42 is connected on the other side of the accelerometer. Transducer housing 32 thus serves as a central, irrotatable support for both of the torque bars. Mass 44 is irrotatably secured to torque bar 40 intermediate the ends of the torque bar, and mass 46 is similarly secured to torque bar 42. Masses 44 and 46 are in the form of discs and have a substantial moment of inertia with respect to rotation about the axis. This moment of inertia, combined with the resilience of the torque bars, creates a rotational mass-spring effect which has a rotational resonant frequency. In the absence of an exciting force, the damping present in the torque bar permits the entire structure to rotate at a constant speed determined by motor 28.

The masses 44 and 46 are constructed so that the effective centers of mass thereof are not on the axis of the accelerometer. Instead, the centers of mass of the two masses are positioned substantially on opposite sides of the axis. The center of mass of the disc which forms the mass 44 is schematically illustrated as lying at point 48, while the center of mass of the disc 46 is illustrated as being below the axis at point 50. In the position illustrated, both centers of mass substantially lie in a vertical plane, the plane of the sheet of the drawing of FIG. 2, through the axis of the accelerometer. The center of mass 48 is shown as lying above the axis and the center of the mass 50 is shown as lying below the axis. The sensitive axis of the accelerometer 10 is perpendicular to a plane passing through the centers of mass and lying parallel to the axis of rotation. Assuming that the sensitive axis is perpendicular to the drawing in FIG. 2 and extending directly toward the viewer, it can be seen that as the discs rotate with housing 22, when they reach the position illustrated and the accelerometer is subjected to an acceleration toward the observer, the mass 44 will have a counterclockwise torque, as viewed from the motor end, while the mass 46 receives a clockwise torque, as seen from that end. With the structure rotating, after it turns a half revolution, it is seen that the centers of masses are reversed so that the center 48 of mass 44 is below the axis, while the center 50 of mass 46 is above the axis. With the continuing acceleration toward the observer, this applies a clockwise torque on mass 44 and a counterclockwise torque on mass 46. The rotational rate of housing 22 is chosen to be equal to the resonant frequency so that an applied acceleration continues to excite the mass-spring system in resonance. The center of mass is chosen to be sufficiently close to the center of rotation of its mass disc so that destructive forces due to rotation are not created at resonant speeds. By this means, linear acceleration along the sensitive axis is converted to modulated angular acceleration about the rotation axis.

The rate of acceleration in the sensitive direction is measured by transducer equipment within the transducer housing 32. Mounting posts 52, of which there are an appropriate number of at least 3, support, on mass 44, mounting plate 54 within the transducer housing 32. The housing is provided with appropriate openings through which the mounting posts 52 extend so that mounting plate 54 can rotate on the axis with disc mass 44 without restraint by housing 32. Similarly, mounting posts 56 carry mounting plate 58 on mass 46 within the housing.

Figure 3:
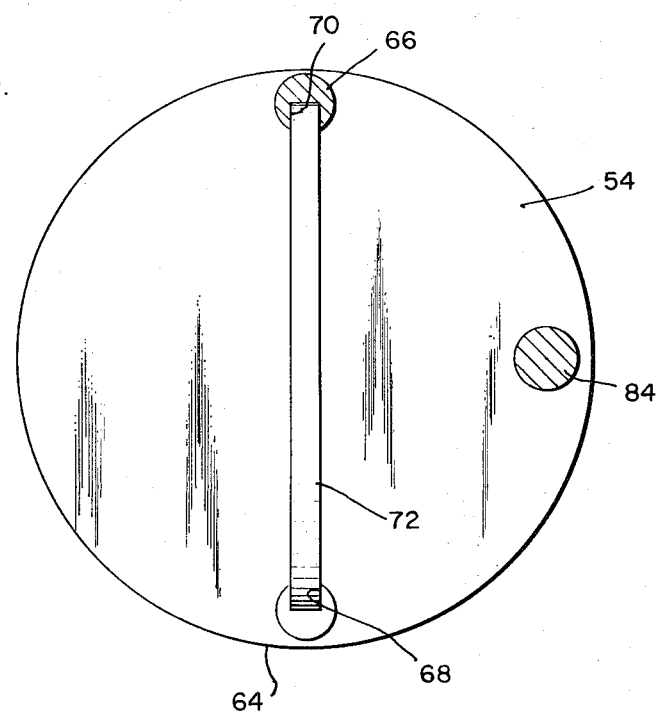
FIG. 3 is a further enlarged section, with parts broken away, taken generally along the line 3—3 of FIG. 2.
Figure 2:
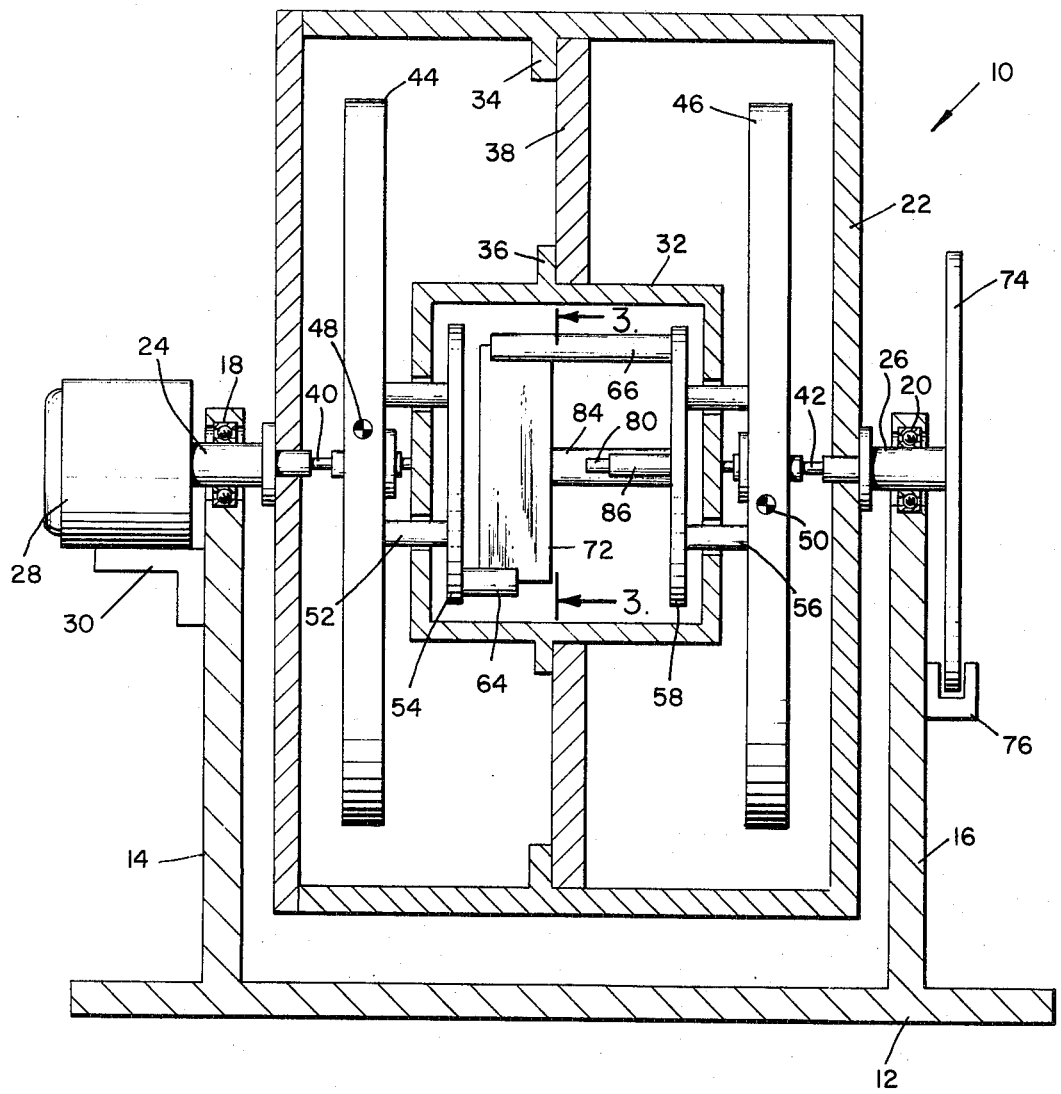
FIG. 2 is an enlarged longitudinal section, taken generally along the line 2—2 of FIG. 1.

As seen in FIGS. 2 and 3, transducer post 64 is mounted on plate 54, while transducer post 66 is mounted on plate 58. As seen in FIG. 3, these posts respectively have slots 68 and 70 therein which grasp the sides of transducer 72 adjacent the ends of the transducer and engage the ends of the transducer to retain it in position. The transducer is held in the posts preferably by adhesive so that the posts can apply bending forces thereto. It can be seen that the transducer 72 is mounted in such a way that it bends on an axis parallel to the axis of rotation of the accelerometer upon relative rotation of mounting plates 54 and 58.

Transducer 80 is mounted at right angles with respect to transducer 72 about the axis of rotation. As seen in FIG. 2, the far mounting post 84 extends from mounting plate 54. The near mounting post is secured to plate 58 and is shown at 86. The transducer 80 is similarly secured in appropriate slots in those mounting posts. By this means, both transducers are bent by relative rotational movement of the masses 44 and 46 about the axis. Counterbalancing masses can be mounted where necessary to achieve dynamic balance of the rotating structure away from the mass discs.

Figure 4:
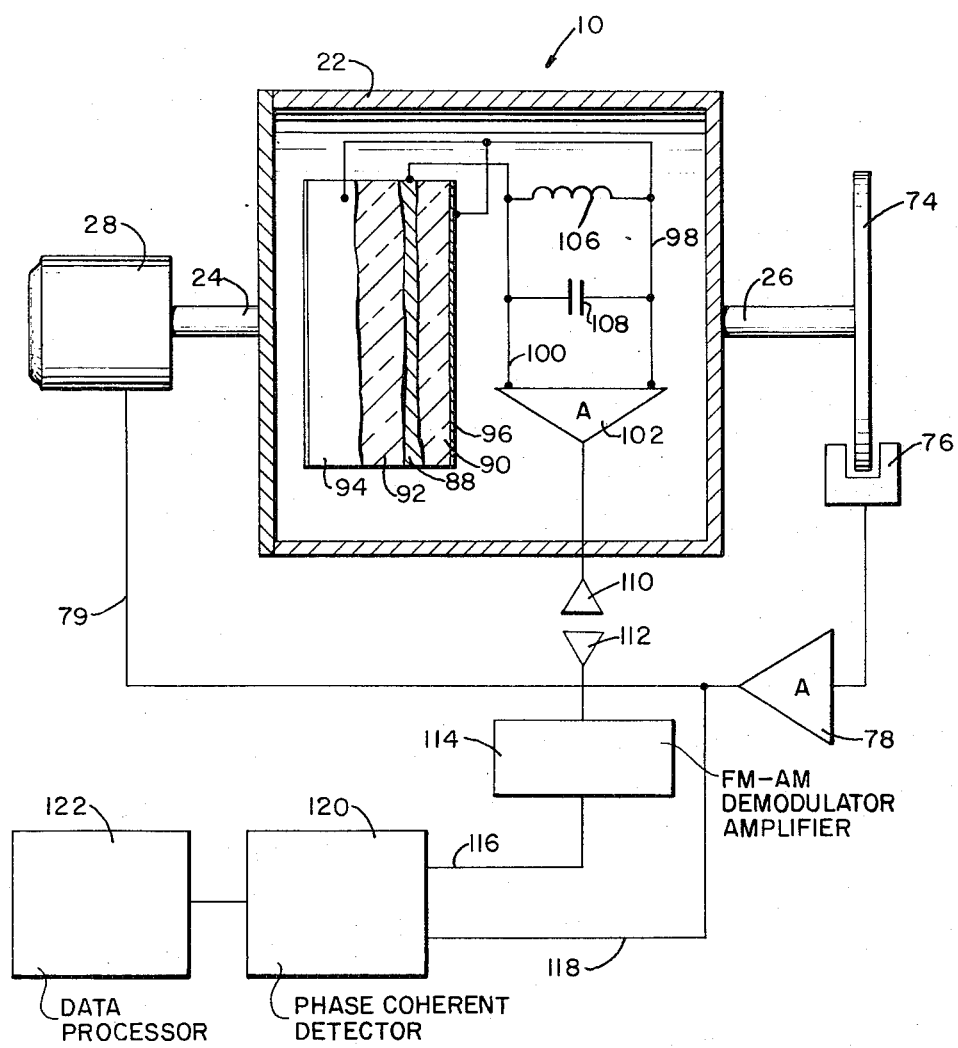
FIG. 4 is a schematic structural diagram showing the electrical connections and output of the rotating dynamic accelerometer of this invention.

In the preferred embodiment, both transducers 72 and 80 are piezoelectric so that this bending causes an electrical output. The two transducers are either connected to be electrically additive or in parallel, depending upon the input characteristics of the preamplifier. A preferred transducer structure is the bender transducer, as sold by Gulton Industries and is made from piezoelectric material sold under the trade name "Glennite G1500." It is a lead zirconate titanate transducer which generates a voltage upon bending in the thin direction of the transducer. As shown in FIG. 4, piezoelectric layers 88 and 90 are separated by a copper shim 92 and are plated on opposite sides with electrically conductive layers 94 and 96. Electric line 98 is connected to both conductive layers 94 and 96, while line 100 is connected to the center shim layer 92. The piezoelectric layers 88 and 90 are arranged to be of the same polarity so that, upon bending of the transducer, one layer is in tension while the other is in compression so that they produce opposite voltage fields. The illustrated connection of lines thus adds the current from the two crystals.

The two transducers 72 and 80 are illustrated in a preferred structure. However, one transducer or more than two transducers can be employed in a suitable physical structure to produce the angular displacement signal. The two transducers 72 and 80 are connected to be electrically additive upon the same relative rotation of the mass discs. Their combined current output is connected into lines 98 and 100. If the accelerations to be measured are not very low, the signals are connected directly into the amplifier 102, which is as linear as practical, at the resonant frequency of the mass-spring system, and with an r.f. amplitude modulated amplifier output.

When low-level accelerations are to be sensed, it is helpful to detune the capacitance of the transducers 72 and 80. From their construction, it is clear that they have inherent capacitance. To detune this capacitance, a fairly large inductance 106 and a fairly small capacitance 108 are connected in parallel across lines 98 and 100, as illustrated in FIG. 4. For two of the particular preferred bending transducers connected for current addition, the value of inductance 106 is preferred to be about 22,000 henries, while the value of capacitor 108 is preferably 0.015 microfarad. Furthermore, when low values of acceleration are to be sensed, a low noise amplifier 102 is required. While it is a conventional AC amplifier responding at the desired frequency in other respects, two field-effect transistors are provided in the front end of the amplifier 102, which transistors are selected for their low noise characteristics. The input to the amplifier 102 is in the order of nanovolts, while its output is in the order of millivolts. The millivolt signal can be processed by conventional equipment.

In a particular example of a device for measuring low linear accelerations, it is to be noted that:

$$a = \alpha \times r \sin \omega t$$

where:
- $a$ = linear acceleration input
- $\alpha$ = angular acceleration difference between the two inertial masses
- $r$ = radius from axis to center of mass.

With an assumed thermal noise limit of the device at $10^{-9}$ rad/sec² for 10 second integration time, and a center-of-mass displacement of 1 cm then the threshold acceleration level is:

$$a = 10^{-9} \text{rad/sec}^2 \times 1 \text{ cm} = 10^{-9} \text{cm/sec}^2 \approx 10^{-12} \text{g's}$$

From this particular specific example, the angular acceleration is at the lower limit of measurability because it is approaching the thermal noise limit of the instrument itself. With the offset of the center of mass at only 1 centimeter from the axis, linear accelerations down to a pico g can be measured.

The structure thus described provides the magnitude of the acceleration, but does not define the direction thereof. The magnitude measured is along any radius to the axis of rotation. In order to obtain the direction of the acceleration, angular position-detecting equipment is employed. Referring to FIGS. 2 and 4, disc 74 is secured on the undershaft 26; thus, it rotates with the mass discs 44 and 46 which are the sensing masses. Detector 76 is associated with angle-indicating disc 74. The disc 74 and its sensor 76 have two functions. The sensor output goes through amplifier 78, appropriately equipped with clamping and gain control, and its output is connected through line 79 to motor 28. By this means, the rotational speed of the entire structure is maintained at resonance.

The output of amplifier 102 is preferably an amplitude-modulated radio frequency signal, which is transmitted through antennas 110 and 112 to an FM-AM demodulator amplifier 114. This amplifier provides a signal in line 116 which contains acceleration amplitude information in its amplitude and contains directional information in its phase angle. Line 118 carries phase angle information, and both lines 116 and 118 are connected to phase coherent detector 120. The output of the phase sensitive or phase coherent detector 120 is vectorial information presenting both the amplitude and the direction of the acceleration vector. The signal goes to data processor 122.

Data processor 122 can conveniently be a direct-reading instrument, it can be a computer input for interpretation of the voltage data, or it can be a recording device for recording the signal for later use. An X-Y plotter is convenient. On the other hand, when a response to the acceleration is required, the signal can be fed through other equipment for amplification, modification and motor control of the device for neutralizing the acceleration of the system. Thus, the data handling device 104 can be any type of data-processing equipment from mere recording or observing of the data to reacting to the value of acceleration data.

The signal is treated as an AC signal because of the resonance of the system and the bending of the spring mass at a frequency rate equal to the rate of rotation of the accelerometer. Thus, the rate of rotation is carefully controlled by feedback line 79 so that it operates at the resonant frequency. Since the signal is handled as an AC signal, it can be readily processed and amplified without problems caused by amplifier drift. However, the amplitude of the AC signal is the value of the acceleration and, for this reason, amplification linearity should be maintained insofar as is possible. Thus, by processing the signal as an AC signal, measurements down to the thermal activity level in the instrument are possible, and useable signals are produced by the accelerometer structure and circuitry described.

This invention having been described in its preferred embodiment, it is clear that it is susceptible to numerous modifications and embodiments within the ability of those skilled in the art and without the exercise of the inventive faculty. Accordingly, the scope of the invention is defined by the scope of the following claims.

What is claimed is:
1. A rotating dynamic accelerometer comprising:
 a base;
 mounting means on said base for defining an axis of rotation;
 a body mounted for rotation on said base with respect to said base, means for rotating said body with respect to said base;
 a mass;
 means for mounting said mass on said body for rotation with said body on said axis with respect to said base, with the center of said mass being away from said axis so that, when an acceleration is applied to said base at an angle to said axis, said mass tends to rotate with respect to said axis;
 said means for mounting said mass including spring means connected between said mass and said body for resiliently connecting said mass and said body, said spring means being deflected by rotary motion of the center of mass around said axis with respect to said body, said spring means applying a returning force, said mass and said spring means being sized to provide torsional resonance at the body rotation speed; and
 means for converting rotation of the center of said mass around said axis with respect to said body due to accelerational forces applied thereon to signals so that, as said mass is rotated, modulated signals are produced.

2. The accelerometer of claim 1 wherein there are first and second masses spaced along said axis, and the centers of said first and second masses are positioned on opposite sides of said axis, said spring means including a torque bar connected between said first and second masses.

3. The accelerometer of claim 2 wherein said first and second masses comprise first and second discs secured to said torque bar.

4. The accelerometer of claim 2 wherein said base carries a bearing thereon for defining said axis, a shaft mounted in said bearing for rotation on said axis, a first torque bar mounted on said shaft carrying said first mass, a second torque bar connected to said shaft and carrying said second mass so that said masses and said torque bars form a mass-spring system having a resonant frequency.

5. The accelerometer of claim 4 wherein a motor is connected to drive said shaft so that said masses and torque bars can be rotated at resonant frequency.

6. A rotating dynamic accelerometer comprising:
 a base;

mounting means on said base for defining an axis of rotation;

a body mounted for rotation on said base with respect to said base, means for rotating said body with respect to said base;

first and second masses;

means for mounting said first and second masses on said body for rotation with said body on said axis with respect to said base, the centers of said first and second masses being positioned on opposite sides of said axis so that, when an acceleration is applied to said base at an angle to said axis, said masses tend to rotate with respect to said axis;

said means for mounting said masses including spring means connected between said masses and said body for resiliently connecting said masses and said body, said spring means being deflected by rotary motion of said centers of said masses around said axis, a resilient, piezoelectric bending bar connected between said first and second masses for converting rotation of the centers of said masses around said axis with respect to said body due to accelerational forces applied thereon to signal so that, as said masses are rotated, modulated signals are produced.

7. A rotating dynamic accelerometer comprising:

a base;

a bearing on said base for defining an axis, a shaft mounted in said bearing for rotation on said axis;

first and second masses connected to said shaft for rotation with said shaft, said first and second masses having centers of mass on substantially opposite sides of said axis;

a torque bar interconnecting said first and second masses with said shaft;

drive means connected to said shaft for rotating said first and second masses around said axis at a speed substantially equal to torsional resonance, transducer means for converting center of mass displacement to displacement signal, said transducer being connected to said first and second masses for measuring the relative rotary displacement of the centers of mass of said first and second masses with respect to each other.

8. The accelerometer of claim 7 wherein said transducer is a piezoelectric bending bar transducer.

9. The accelerometer of claim 8 where a first post is connected to said first mass and a second post is connected to said second mass, said bending bar transducer being connected to said first and second posts so that said transducer is bent by relative rotation of said first and second masses about said axis.

10. The accelerometer of claim 9 wherein there are first and second transducers, said first and second transducers each being connected between said first and second discs and oriented at an angle with respect to each other, said first and second transducers each producing a signal related to relative rotation of said masses about said axis.

* * * * *